May 28, 1946.                J. G. VINCENT ET AL                2,400,964
                    LUBRICATING MEANS FOR DRIVE MECHANISM
                    Filed April 19, 1943          3 Sheets-Sheet 1
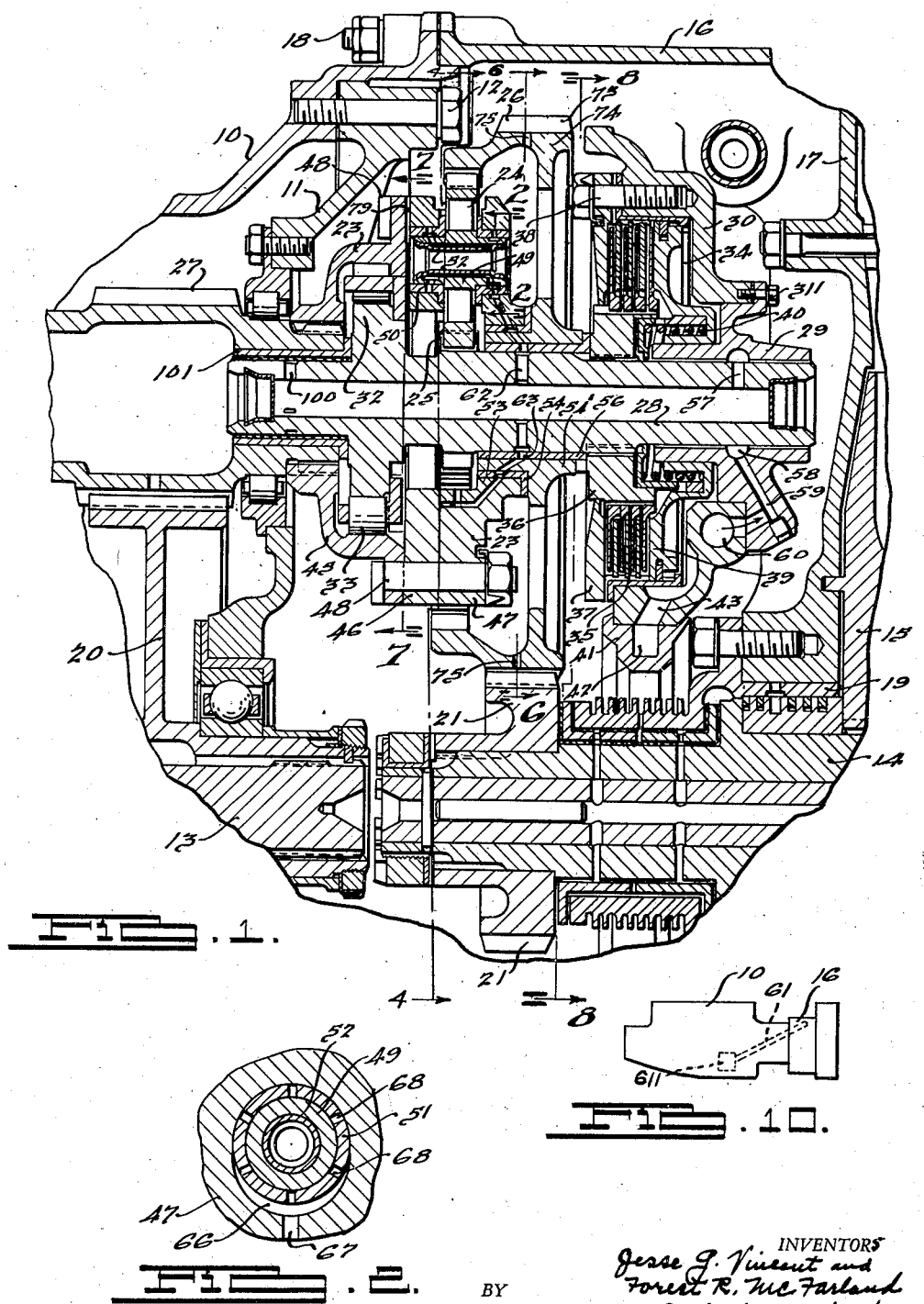
INVENTORS
Jesse G. Vincent and
Forest R. McFarland
Tibbetts & Hart
ATTORNEYS

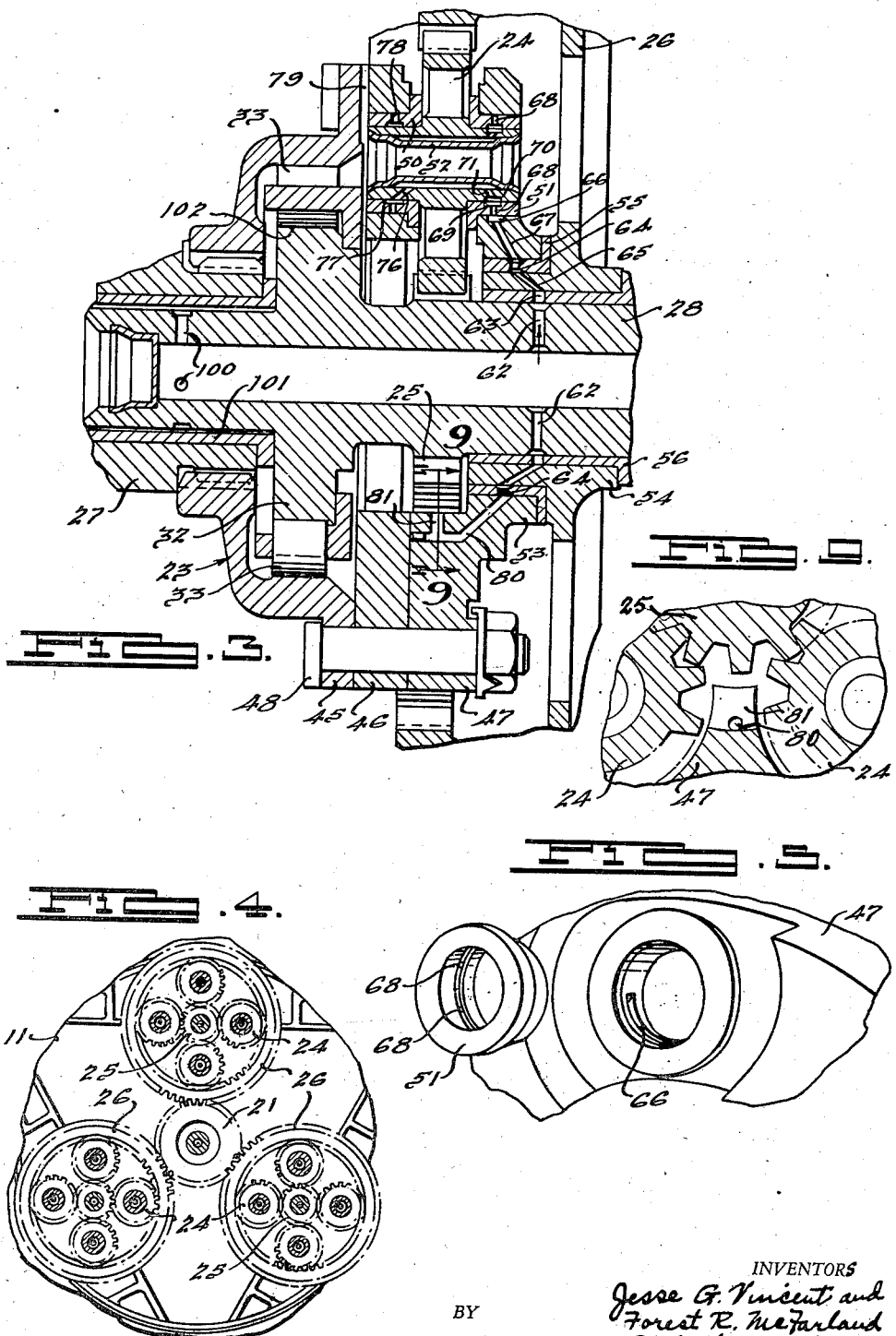

May 28, 1946.   J. G. VINCENT ET AL   2,400,964
LUBRICATING MEANS FOR DRIVE MECHANISM
Filed April 19, 1943   3 Sheets-Sheet 3
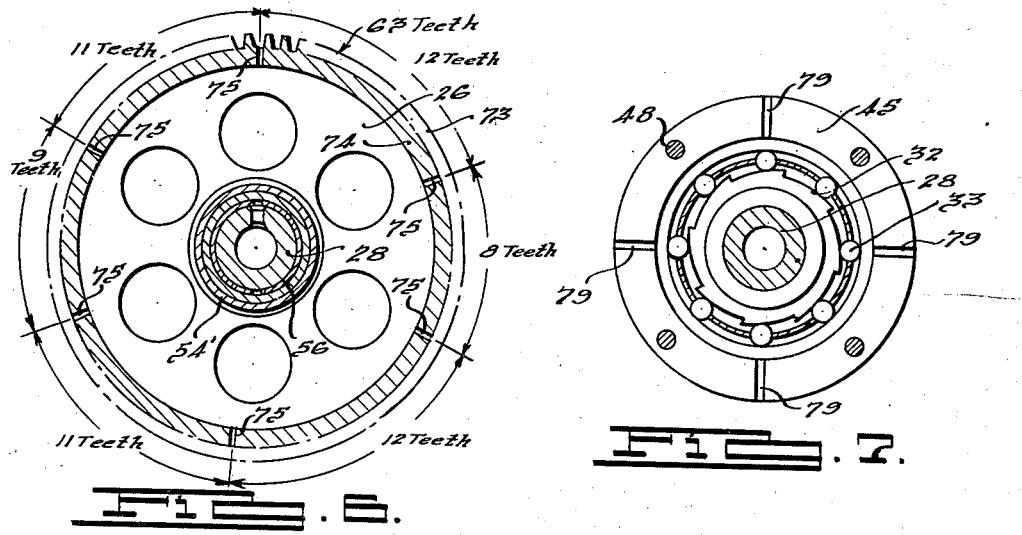
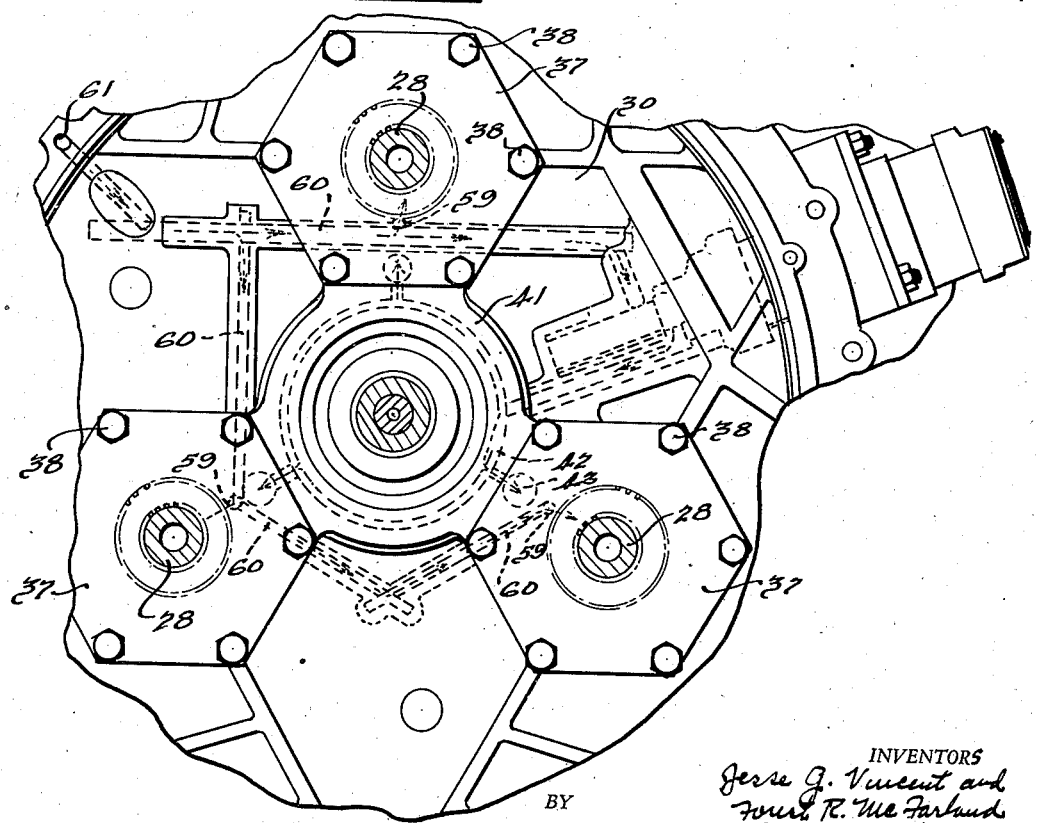
INVENTORS
Jesse G. Vincent and
Forest R. McFarland
BY Tibbetts + Hart
ATTORNEYS Patented May 28, 1946

2,400,964

UNITED STATES PATENT OFFICE 2,400,964

LUBRICATING MEANS FOR DRIVE MECHANISM

Jesse G. Vincent, Grosse Pointe Park, and Forest R. McFarland, Huntington Woods, Mich., assignors to Packard Motor Car Company, Detroit, Mich., a corporation of Michigan Application April 19, 1943, Serial No. 483,670

7 Claims. (Cl. 184—6)

This invention relates to drive mechanism and more particularly to lubrication of such mechanism.

In some types of high speed gearing lubricating oil is moved by pressure through duct means interior of the gearing to the points to be lubricated. Difficulty has been encountered in obtaining the desired lubrication of gearing at certain points due to sludge, separated from the oil by centrifugal force, stopping up the duct means. Difficulty has also been encountered because of the lack of direction of oil to some of the bearing portions of such gearing.

An object of the invention is to improve the lubrication of high speed drive gearing by elimination of oil sludge and lubricating all of the bearing portions by a direct supply of oil.

Another object of the invention is to provide an oil feeding system internally of high speed drive gearing in which oil sludge will not interfere with an adequate oil delivery to the bearing points.

Another object of the invention is to provide a lubricating system for planetary gearing in which the sun gear and ring gear teeth will be lubricated by oil flowing onto the planet pinions by centrifugal force from a pressure lubricating system for the bearings.

Another object of the invention is to provide for the periodic lubrication of the teeth of a driving gear in high speed gearing through the arrangement of openings in the gear through which oil is moved by centrifugal force.

Another object of the invention is to efficiently and adequately lubricate the teeth and bearing in a high speed planetary gearing drive mechanism.

Other objects of the invention will appear from the following description taken in connection with the drawings, which form a part of this specification, in which:

Fig. 1 is a vertical sectional view of driving mechanism having a lubricating system incorporating the invention;

Fig. 2 is a sectional view taken on line 2—2 of Fig. 1;

Fig. 3 is an enlarged fragmentary sectional view of the structure shown in Fig. 1 illustrating the lubricating system;

Fig. 4 is a sectional view through the planetary gear taken approximately on line 4—4 of Fig. 1;

Fig. 5 is a fragmentary exploded perspective view of the planet gear cage and one of the floating bearings for a planet gear;

Fig. 6 is a sectional view taken on line 6—6 of Fig. 1 showing the ring gear of the planetary gearing;

Fig. 7 is a sectional view taken on line 7—7 of Fig. 1 showing a section of the planetary gearing cage;

Fig. 8 is a sectional view taken on line 8—8 of Fig. 1 showing the oil feeding manifolding for the planetary gear sets in the drive mechanism;

Fig. 9 is a fragmentary sectional view taken on line 9—9 of Fig. 3 showing the lubricating system for the teeth of the sun gear and pinions;

Fig. 10 is a reduced side elevation of an engine and supercharger structure therefor.

The drive mechanism shown in the drawings is arranged to step up the drive from an engine-rotated part 13, such as a crankshaft extension, to an engine accessory, such as an impeller 15 of a fuel supercharger device. The engine casing 10 has a transverse end wall 11 secured thereto by bolts 12 and a casing 16 for the drive mechanism and the supercharger device is secured to such end of the engine casing by bolts 18. A transverse wall 17 in the casing 16 separates a gearing chamber from a supercharger fuel chamber and a tail shaft 14 extends through journal 19 in wall 17. The impeller is splined on such shaft in the fuel chamber and a driven gear 21 is fixed to such shaft in the gearing chamber.

Drive gear 20 is splined to shaft 13 and drives a plurality of similar sets of similarly identified planetary gearing drivingly connected with driven gear 21. Each set of gearing includes a cage 23 carrying planet pinions 24, a sun gear 25 and a ring gear 26. A hollow gear 27 is splined to each cage and such hollow gears mesh with drive gear 20. The sun gear is fixed on a shaft 28 extending through the cage and the ring gear and mounted in the hollow gear 27 at one end and in a bearing 29 at the other end. The bearing is fixed to wall 30 extending transversely of the gearing chamber portion of casing 16 and is secured to such wall by bolts 311. Shaft 28 has a hub 32 with peripheral cam surfaces 102 and between the cam surfaces and the cage are rollers 33 providing an overrunning clutch for locking the cage and sun gear together to provide a 1:1 drive through the planetary gearing when the sun gear is free to rotate.

Each planetary gearing set is provided with means for braking the sun gear when a stepped up drive is desired. The wall 30 is formed with chambers 34 for housing the brake means which can consist of plates 35 alternately fixed to the wall and to hubs 36 splined on shafts 28. Each brake means also includes a backing disk 37 fixed to the wall by bolts 38 and an actuator in the form of a disk or piston 39. The actuator is normally moved to brake disengaging position by coil spring 40 and is moved to brake engaging position by fluid under pressure. The wall section 41 fits in an opening through wall 30 and has an annular groove 42 connected with the brake chambers 34 by passages 43. Groove 42 can be connected with fluid under pressure, such as the engine lubricating system, and some form of fluid flow control is employed to apply or release the fluid pressure as desired. Such a brake system and control forms the subject matter of co-pending Serial No. 483,669 filed April 19, 1943.

The internal combustion engines to which this invention applies can be used to operate aircraft or some other high speed device in which an accessory is driven from the crankshaft at a speed stepped up several times beyond the crankshaft speed. The present invention has to do with the lubrication of such high speed accessory driving gearing and makes provision for adequate lubrication and without sludging of the oil.

Each cage 23 is formed of three aligned sections 45, 46 and 47 secured together by bolts 48, section 45 being splined or otherwise fixed to rotate with gear 27. Walls 46 and 47 are formed substantially as rings having openings therein into which the ends of hollow planet pinion hubs 49 project and floating sleeve bearings 50 and 51 are arranged between the hub ends and the walls. A sleeve 52 is arranged in each of the hollow pinion hubs and the ends are spun into sealed relation with the ends of the hubs. The portion of the sleeve between the spun ends is of smaller diameter than the hollow interior of the hub and forms therewith a chamber through which oil can flow. Section 47 of the cage has a hub 53 journalled on a hub 54 of the ring gear and bearing 55 is arranged between such hubs. The ring gear hub is journalled on shaft 28 and bearing 56 is arranged therebetween. Cage section 45 forms an end closure for one face of ring section 46 and a circular race for the clutch rollers 33.

The gears and bearing portions of the planetary gearing are lubricated by a system in which oil is first moved by pressure to the bearings and then moved by centrifugal force to the gear teeth. The system can be separate but preferably is formed as a part of the engine pressure lubricating system. Shaft 28 in each planetary gearing set is hollow and forms a chamber from which oil is fed through duct means to the adjacent bearings. A branch passage 61, leading from the main lubricating system pump 611, connects in wall 30 with manifold passages 60 extending to the passages 59 leading to an annular groove 58 in bearings 29. These grooves are connected with the interior chambers in the shafts 28 by inlet passages 57 extending radially through the shafts.

The duct means leads from the chamber in the shafts 28 to all of the planetary gearing bearings. Shaft 28 has inner and outer peripheral grooves connected by radial passages 62. Bearing 56 is fitted to rotate with hub 54 and four passages 63 extend therethrough leading one toward each planet pinion. Bearing 55 is arranged to float between section 47 of the cage and ring gear hub 54 and has passages 64 connected with passages 65 in the ring gear communicating with passages 63. The bores in the cage section 47 include grooves 66 connected with passages 64 by passages 67 extending through the cage hub 53. The grooves 66 are exposed to bearing 51 and are in open communication with radial openings 68 in the floating bearing that terminate in an annular groove 69. The adjacent pinion hub end has a peripheral groove 70 open to groove 69 and radial passages 71 extend through the pinion hub to the chamber formed by sleeve 52. Oil under pressure flows from the interior of the shafts 28 to the interior of the pinion hubs through the duct means formed by the passages and grooves just described. Oil passing through such duct means will escape to lubricate the adjacent surfaces of bearing 56 and shaft 28, the adjacent surfaces of bearing 55 and the hubs 53 and 54, and the surfaces of the cage section 47 and the pinion hub adjacent the floating bearing 51.

The passages 68 are spaced around the floating bushing and the grooves 66 have sufficient length circumferentially to overlie at least two of the passages 68 in any position of its rotative movement. Thus, there will always be two passages 68 through which oil can flow from groove 66 and the other passages 68 will be substantially closed to oil flow. In such construction, there is no stagnant circumferential groove area in which sludge, separated from the oil by the action of centrifugal force, can build up to block oil movement through passage 68.

The oil as it flows from around bearing sleeve 51 will be thrown by centrifugal force to the surrounding rim of the ring gear. In order to take advantage of this condition for lubricating the external teeth 73 of the ring gears and the gear 21 with which they mesh, the ring gear rim 74 is formed with a plurality of radial openings 75 between the teeth. Such openings are so spaced as to be in balance and to convey substantially equal quantities of oil directly to each of the teeth on gear 21 in a given number of revolutions. Gear 21 has 30 teeth and ring gears 73 have 63 teeth, but the number of such teeth could be varied provided they are not prime to each other. With the specified number of teeth on the gears, the openings 75 in each ring gear are spaced consecutively circumferentially by 9 teeth, 11 teeth, 12 teeth, 8 teeth, 12 teeth and 11 teeth to directly lubricate each tooth on gear 21 twice from each ring gear in every 21 revolutions. The pinion gear 21 has a speed of more than 24,000 revolutions per minute and the ring gears have a speed of more than 9,000 revolutions per minute, so this efficient manner of lubricating their meshing teeth will increase the life of the gears.

Oil passing into the chambers formed by sleeves 52 and the pinion hubs is utilized to lubricate the surfaces of floating bearings 50. The ends of the pinion hubs within bearing 50 are formed with radial passages 76 that are exposed to an annular groove 77 in the bearing sleeve and radial passages 78 extend from groove 77 through the sleeve. Oil in the chamber will be under pressure and will flow through the duct means comprising passages 76 and 78 and groove 77 to lubricate sleeve bearings 50.

Oil flowing from the ends of the sleeve bearings 50 enclosed by the cage section 45 must pass through relatively small spaces to escape from the cage with the result that provision must be made to prevent the formation of sludge, resulting from centrifugal force, which would block the release of oil. In order to prevent the collection of oil sludge at these portions of the sets of planetary gearing, relief means in the form of radial slots 79 are formed in the end face of cage section 45 that is secured against cage section 46. These slots are arranged to register with the enclosed ends of the planet pinions and their surrounding bearing sleeves and extend radially to the exterior of the cage so that centrifugal force will act to throw the escaping oil outwardly through the slots to the exterior of the cage.

The planetary gearing lubricating system is also utilized to direct oil to the sun gears. Passages 80 are provided in the cage ring section 47 to provide duct means through which oil in circuit to the pinion bearings will be diverted to the interior of the cage between and in a plane with the planet pinions. Oil flowing from these duct means under pressure and centrifugal force will be moved circumferentially along the walls of the slots 81 from which it will pass to the teeth of adjacent planet pinions. The oil on the pinions will be carried onto the teeth of the sun gears in the sets of planetary gearing to provide lubrication for such bearing surfaces.

The shafts 28 are formed with radial passages 100 through which oil under pressure will flow to bearings 101 between shafts 28 and gears 27. Oil draining from the sets of planetary gearing will collect in the casings 10 and 16 and will be recirculated in the engine lubricating system.

The system herein described will adequately lubricate the bearings and gears of a high speed planetary gearing drive mechanism without sludging of the oil.

Although the invention has been described in connection with a specific embodiment, the principles involved are susceptible of numerous other applications which will readily occur to persons skilled in the art.

What is claimed is:

1. In a lubricating system for planetary gearing drive mechanism having a planet gear with a hollow hub, a cage having spaced walls with openings into which the gear hub ends project, and floating bearing sleeves in the wall openings and surrounding the ends of said gear hub, lubricant feeding means comprising an inlet duct in one wall of the cage, a groove extending circumferentially part way around the opening boundary surface in one wall of the cage and communicating with the inlet duct, a plurality of circumferentially spaced radial passages through each of the bearing sleeves, said groove being open to at least two of the radial passages in any rotative position of the adjacent bearing sleeve, and a groove extending circumferentially around the inner surface of each bearing sleeve and open to the radial passages therein.

2. In a high speed drive mechanism, a hollow gear shaft with a plurality of circumferentially spaced passages therethrough adjacent each end, a sleeve in said shaft forming a chamber with which the passages communicate, plain bearings around the ends of the shaft, said bearings each having an interior annular groove open to the adjacent shaft passages and radial passages therethrough opening to the groove, and a rotatable member having walls with openings in which the plain bearings are mounted, one wall having a lubricant inlet duct and a groove extending circumferentially part way around the inner surface forming one of the openings and in communication with the duct, said last mentioned groove having sufficient length circumferentially to always be open to one of the radial passages in the adjacent bearing.

3. In a planetary gearing drive mechanism, a ring gear, a sun gear, planet pinions meshing with said gears, a cage structure in which said pinions are journalled, duct means in the cage structure having an outlet in a plane with and between two of the planet pinions, and a pressure lubricating system connected with the duct means, the lubricant passing from the duct means being thrown by centrifugal force onto the planet pinions to lubricate the tooth portions of the gears meshing therewith.

4. In a planetary gearing drive mechanism, a ring gear, a shaft extending axially through the ring gear, said shaft having an interior chamber, a sun gear fixed on the shaft in a plane with the ring gear, a cage structure, a plurality of planet pinions in a plane with and meshing with said gears, said pinions being journalled in the cage structure, duct means leading from the interior chamber in the shaft through the cage structure, said duct means having an outlet end opening between two pinions and in a plane with the pinions, and a pressure lubricating system connected with the chamber in the shaft, the lubricant flowing from the duct means being thrown by centrifugal force on the pinions to lubricate the teeth of the gears meshing therewith.

5. In a planetary gearing drive mechanism, a cage, planetary pinions journalled in the cage, duct means in the cage opening to the interior thereof between two pinions, and a pressure lubricating system connected with said duct means, oil being thrown by centrifugal force from each duct means upon the teeth of the adjacent pinions.

6. In a planetary gearing drive mechanism, a cage formed in three sections secured together in axial alignment, one of said cage end sections forming a closure and having radial grooves in the face adjacent the intermediate section, planet pinions, floating bearings in the intermediate cage section and the end cage section remote from the closure section carrying the ends of the pinions, the bearings in the intermediate cage section being exposed to the grooves in the adjacent face of the closure cage section, and a pressure lubricating system connected with the floating bearings and the oil escaping from the bearings adjacent the grooves passing through the grooves to the exterior of the cage.

7. In a planetary gearing drive mechanism, a cage having two spaced walls with aligned openings therein parallel to the cage axis, a planet pinion between the walls, said pinion having hub ends rotatably mounted in the aligned openings in the walls, a third cage wall secured against one of the spaced walls having a radial groove extending from the opening in the adjacent wall to its periphery, and means for feeding lubricant to the pinion hub ends in the cage walls, said groove serving as an outlet for oil flowing from the adjacent opening.

JESSE G. VINCENT.
FOREST R. McFARLAND.